(12) United States Patent
Chan et al.

(10) Patent No.: US 7,505,993 B2
(45) Date of Patent: Mar. 17, 2009

(54) DATABASE SCHEMA FOR CONTENT MANAGED DATA

(75) Inventors: Victor Chan, Thornhill (CA); Darl Andrew Crick, Keswick (CA); Miu-To Brenda Lam, North York (CA); Wan Ngai Wayne Lee, North York (CA); Jacob Vandergoot, Bradford (CA); Tony Chung Keung Woo, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 11/304,015

(22) Filed: Dec. 14, 2005

(65) Prior Publication Data
US 2007/0136325 A1    Jun. 14, 2007

(51) Int. Cl.
*G06F 7/00* (2006.01)
*G06F 17/00* (2006.01)
(52) U.S. Cl. .................................. 707/102; 707/103 R
(58) Field of Classification Search ......... 707/100–102, 707/103 R, 10
See application file for complete search history.

(56) References Cited

U.S. PATENT DOCUMENTS

| | | | | |
|---|---|---|---|---|
| 5,752,245 | A | 5/1998 | Parrish et al. .................. | 707/10 |
| 6,334,146 | B1 | 12/2001 | Parasnis et al. ............. | 709/217 |
| 6,591,272 | B1 * | 7/2003 | Williams .................... | 707/102 |
| 6,606,633 | B1 * | 8/2003 | Tabuchi ...................... | 707/102 |
| 6,868,425 | B1 * | 3/2005 | Bergstraesser et al. .. | 707/103 R |
| 7,130,863 | B2 * | 10/2006 | Diab ...................... | 707/103 R |
| 7,266,565 | B2 * | 9/2007 | Diab .......................... | 707/102 |
| 2004/0260715 | A1 | 12/2004 | Mongeon et al. ............ | 707/101 |
| 2005/0055351 | A1 * | 3/2005 | Barton et al. ................. | 707/10 |
| 2005/0065942 | A1 * | 3/2005 | Diab .......................... | 707/100 |

FOREIGN PATENT DOCUMENTS

JP        2000004272        1/2000

OTHER PUBLICATIONS

Shirley Wang, Gerald Kozina, "Dynamic Order to Remote Data Base DB2 or Oracle Asynchronize Fetching Data" IBM Research Disclosure, Jul. 2001, No. 447, article 170, p. 1259.
Sudha Ram and V. Ramesh, "Collaborative Conceptual Schema Design: A Process Model and Prototype System", ACM Transactions on Information Systems, vol. 16, No. 4, Oct. 1998, pp. 347-371.

(Continued)

*Primary Examiner*—Hung T Vy
(74) *Attorney, Agent, or Firm*—Patterson & Sheridan, LLP

(57) ABSTRACT

Embodiments of the present invention is directed to a data structure in conformance with a database schema for accessing and managing content managed data and to a system, a method and a computer program product for creating the database schema. According to one embodiment of the invention, a method for creating a database schema for accessing and managing content managed data comprising the steps of: creating a base schema; creating a write schema; and creating a read schema; the database schema used by a business logic application to access and manipulate the content managed data in the database. Embodiment of the present invention manages changes to the data using the write schema and the read schema rather than by using a modified base schema.

8 Claims, 6 Drawing Sheets

OTHER PUBLICATIONS

Pingli Pang et al., "A Multimedia Database System for Craniofacial Research and Diagnosis" ACCV'95, Second Asian Conference on Computer Vision, Dec. 5-8, Singapore.

Reidar Conradi et al., "Version Models for Software Configuration Management" ACM Computing Surveys, vol. 30, No. 2, Jun. 1998.

Stanley Y.W. Su et al., "Transformation of Data Traversals and Operations in Application Programs to Account for Semantic Changes of Databases", ACM Transactions on Database Systems, vol. 6, No. 2, Jun. 1981, pp. 255-294.

* cited by examiner

```
CREATE VIEW READ.CATALOG AS
SELECT
        CATALOG_ID, MEMBER_ID, IDENTIFIER,
DESCRIPTION,
        TPCLEVEL
FROM
        BASE.CATALOG
WHERE
        NOT EXISTS (SELECT CATALOG_ID FROM
        WRITE.CATALOG WHERE
        BASE.CATALOG.CATALOG_ID =
        WRITE.CATALOG.CATALOG_ID)
UNION ALL
SELECT
        CATALOG_ID, MEMBER_ID, IDENTIFIER,
DESCRIPTION,
        TPCLEVEL
FROM
        WRITE.CATALOG
WHERE
        WRITE.CATALOG.CONTENT_STATUS <> 'D'
```

FIGURE 5

DATABASE SCHEMA FOR CONTENT MANAGED DATA

FIELD OF INVENTION

The present invention relates to the field of database management systems. In particular, it relates to a data structure in conformance with a database schema for managing and accessing content managed data, and a system, method and computer program product for creating the database schema.

BACKGROUND

Business enterprises use database management systems (DBMS) to store business information commonly known as content data in the form of business objects. One or more business applications can create, modify and access the content data in support of business activities. For example, the content data can include information about items in the enterprise's product portfolio such as product name, part number, product description, an image of the product, pricing information, inventory or availability information and other similar product related information. One or more applications can be used to manipulate selected content data in order to create, for example, seasonal catalogues (e.g. fall, winter and spring catalogues).

As the content data can be used to support one or more critical business activities, integrity of the content data is important. This can prove problematic when new content data is being developed or existing content data is being modified. In order to properly verify the new or modified content data it is often desirable to test the new or modified content data before it is made available to a general audience of users. The risk to content data integrity usually precludes testing using a production database.

An approach that has been used to address these needs is to create an authoring environment in which content data can be modified and new content data can be added without immediately committing them to the production database. This approach normally requires changes to the database schema to enable management of the content data in the authoring environment. Changing the database schema necessitates changes to applications that work with the production database. Therefore, applications need to be modified in the authoring environment with respect to the applications in the production database environment. This can add to the cost and complexity of testing changes to the content data.

SUMMARY OF INVENTION

Embodiments of the present invention are directed to a data structure in conformance with a database schema for accessing and managing content managed data and to a system, a method and a computer program product for creating the database schema. According to one embodiment, a base schema, a write schema and a read schema that comprise the database schema provide for an application compatible with a production database containing corresponding content data to be used unchanged with the content managed data. Embodiments of the present invention manage changes to the data using the write schema and the read schema rather than by using a modified base schema.

In accordance with one aspect of the present invention, there is provided a data structure embodied on a computer-readable medium in conformance with a database schema for accessing and managing content managed data in a database, the database schema comprising: a base schema representing a content data table and an operational data table; a write schema representing a content managed data table and a content managed operational data table; and a read schema representing the content managed operational data table and having a view representing the content managed data table and the content data table; the database schema used by a business logic application to access and manipulate the content managed data in the database.

In accordance with another aspect of the present invention, there is provided a method for creating a database schema for accessing and managing content managed data comprising the steps of: creating a base schema representing a content data table and an operational data table; creating a write schema representing a content managed data table and a content managed operational data table; and creating a read schema representing the content managed operational data table and having a view representing the content managed data table and the content data table; the database schema used by a business logic application to access and manipulate the content managed data in the database.

In accordance with still another aspect of the present invention, there is provided a computer program product for creating a database schema for accessing and managing content managed data, the computer program product comprising: a computer usable medium having stored thereon computer-executable instructions, the computer-executable instructions when executed on a computer instructing the computer for: creating a base schema representing a content data table and an operational data table; creating a write schema representing a content managed data table and a content managed operational data table; and creating a read schema representing the content managed operational data table and having a view representing the content managed data table and the content data table; the database schema used by a business logic application to access and manipulate the content managed data in the database.

In accordance with yet another aspect of the present invention, there is provided a database management system for creating a database schema for accessing and managing content managed data comprising: an element for creating a base schema representing a content data table and an operational data table; an element for creating a write schema representing a content managed data table and a content managed operational data table; and an element for creating a read schema representing the content managed operational data table and having a view representing the content managed data table and the content data table; the database schema used by a business logic application to access and manipulate the content managed data in the database.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

Embodiments of the present invention will be described in conjunction with drawings in which:

FIG. 5 is an exemplary definition of a database view in accordance with a read schema according to an embodiment of the present invention;

DETAILED DESCRIPTION

Figure 1:
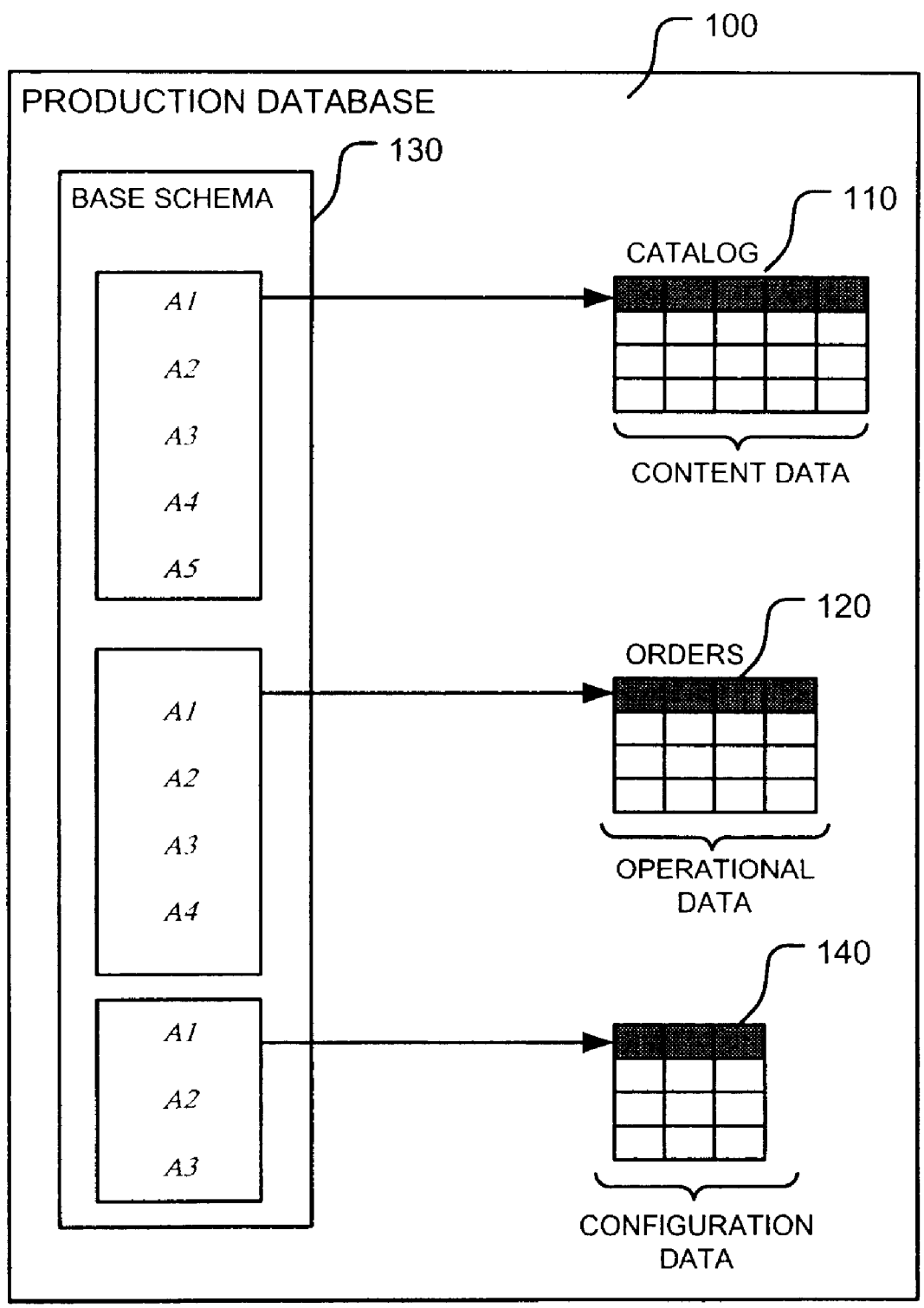
FIG. 1 is a schematic representation of an exemplary production database for an enterprise having a catalog of products for which orders can be placed according to an embodiment of the present invention.

FIG. 1 is a schematic representation of an exemplary production database 100 for an enterprise having a catalog of products for which orders can be placed. The database 100 contains two tables 110, 120 and a base schema 130. A first table 110 contains content data representing information related to the catalog and is named 'CATALOG.' A second table 120 contains operational data representing information related to orders received and is named 'ORDERS.' The base schema 130 provides a representation for each of the two tables 110, 120 that can be used by a business logic application to access the information contained in the tables 110, 120. The base schema 130 provides information characterizing each field in the tables 110, 120. The fields correspond to the columns in the tables 110, 120. The base schema 130 also provides information characterizing the fields in a configuration data table 140 containing static configuration information about a database management system (DBMS) with which the database 100 is implemented.

Figure 2:
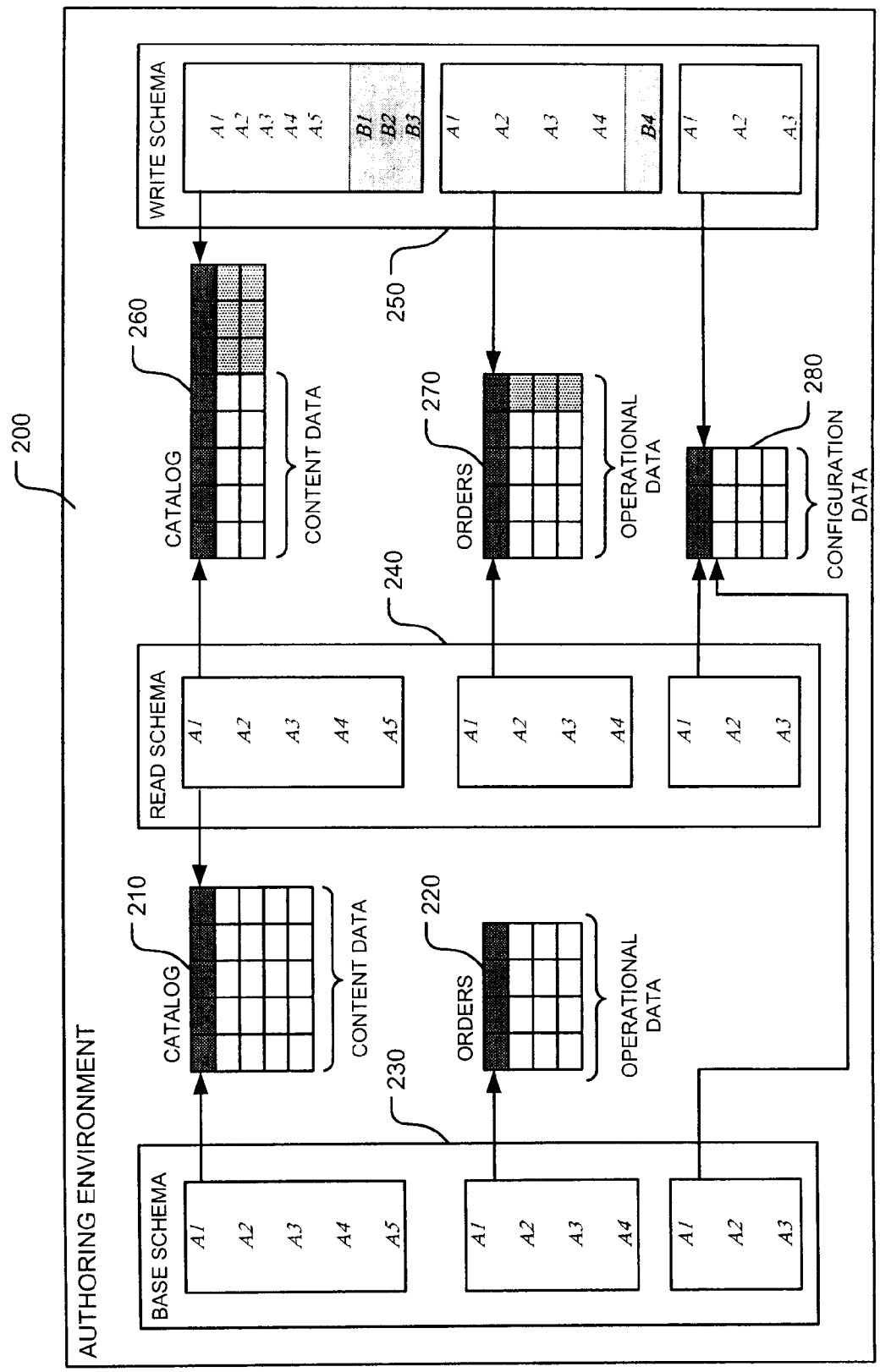
FIG. 2 is a schematic representation of an exemplary data schema according to an embodiment of the present invention together with an authoring environment in which the data schema can be used.

FIG. 2 is a schematic representation of an exemplary data schema according to an embodiment of the present invention together with an authoring environment 200 in which the data schema can be used. The authoring environment 200 contains five database tables 210, 220, 260, 270, 280 and three schemas 230, 240, 250. The base schema 230 represents the CATALOG table 210 and the ORDERS table 220, each of the schema and tables being copied (imported) from their respective counterparts in the production database 100 (i.e. 130, 110 and 120 respectively). Existing indices and foreign key constraints can be maintained. The base schema 230 can also provide information characterizing the fields in a configuration data table 280 containing static configuration information about a database management system (DBMS) with which the authoring environment 200 is implemented.

Figure 3:
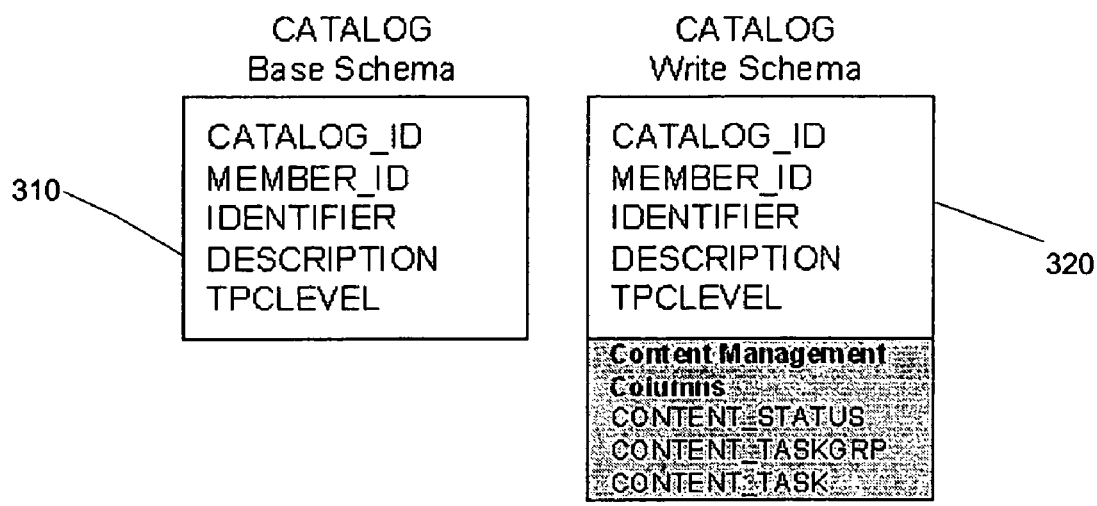
FIG. 3 is a representation of fields of a base schema and a write schema, according to an embodiment of the present invention, for a content data table.

The write schema 250 represents tables that contain either content data or operational data. A table containing content data that is represented in the write schema 250 is known as a content managed data table. In the exemplary authoring environment 200 the write schema 250 represents the CATALOG table 260 and the ORDERS table 270. CATALOG table 260 has the same fields (i.e. columns) as the CATALOG table 210 (white backgrounds in table 260) plus additional fields for content management information (light gray backgrounds in table 260). The content management fields are used to record information about the changes that are made to the content data business objects (i.e. rows in the table 260). FIG. 3 is a representation of fields of the base schema 230 (indicated as 310) and the write schema 250 (indicated as 320) that represent the content data CATALOG tables 210 and 260, respectively, contained in the exemplary authoring environment 200 according to an embodiment of the present invention. The information in the content management fields of the write schema 250 includes the operation (e.g. create, modify, delete) performed on the business object (i.e. field CONTENT-STATUS) and can include, for example, the identity of a task group and task under which the operation was performed. The write schema 250 provides information characterizing each field in the table 260, both the fields that are the same as those characterized in the base schema 230 (over white background in write schema 250) and the content management information fields (over light gray background in write schema 250).

Figure 4:
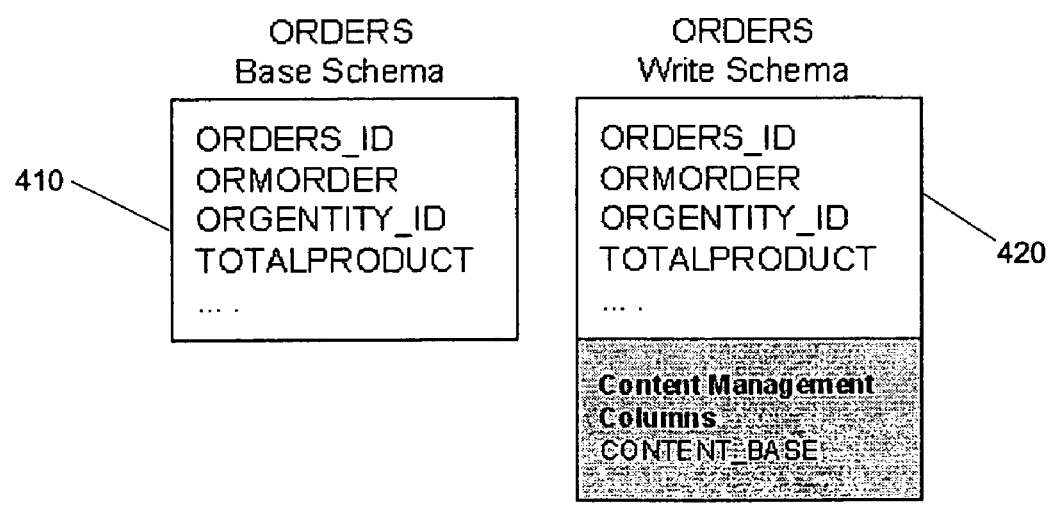
FIG. 4 is a representation of fields of a base schema and a write schema, according to an embodiment of the present invention, for an operational data table.

ORDERS table 270 has the same fields (i.e. columns) as the ORDERS table 220 (white backgrounds in table 270) plus additional fields for content management information (light gray backgrounds in table 270). FIG. 4 is a representation of fields of the base schema 230 (indicated as 410) and the write schema 250 (indicated as 420) that represent the operational data ORDERS tables 220 and 270, respectively, contained in the exemplary authoring environment 200 according to an embodiment of the present invention. The information in the content management fields of the write schema 250 can include, for example, an indication as to whether or not the business object was populated by copying from the corresponding base schema 230 represented table (e.g. 220). The write schema 250 provides information characterizing each field in the table 270, both the fields that are the same as those characterized in the base schema 230 (over white background in write schema 250) and the content management information fields (over light gray background in write schema 250). The write schema 250 can also provide information characterizing the fields in the table 280 containing configuration data for the authoring environment.

The read schema 240 represents the content data that results when the purposed changes represented by the write schema 250 are merged with the current content represented by the base schema 230. This is achieved by creating a view for each content data table, the view having the same name as the table it represents. The view selects the content in the base schema 230 represented table (e.g. CATALOG table 210) along with the changes made in the corresponding write schema 250 represented table (e.g. CATALOG table 260).

Although the present exemplary authoring environment 200 has only one content data table—table CATALOG represented by tables 210, 260—it will be understood that the authoring environment 200 can have any number of content data tables while remaining within the scope and spirit of the present invention. All content data tables that are content managed will have a view of the same name created in the read schema 240.

The changes represented in the write schema 250 take precedence over the content represented in the base schema 230. A new business object represented in the write schema 250 will appear in the view. A modified business object represented in the write schema 250 will appear in the view in place of a corresponding business object represented in the base schema 230. A business object represented in the write schema 250 that is marked as deleted will not appear in the view nor will a corresponding business object represented in the base schema 230.

FIG. 5 is an exemplary definition of a database view in accordance with the read schema 240 according to an embodiment of the present invention. The view selects from the table CATALOG 210 represented by the base schema 230 the business object fields CATALOG_ID, MEMBER_ID and IDENTIFIER for those business objects for which a business object having the same CATALOG_ID value does not exist in the table CATALOG 260 represented by the write schema 250. The resulting selection is combined with business object fields CATALOG_ID, MEMBER_ID and IDENTIFIER for those business objects in the table CATALOG 260 represented by the write schema 250 whose CONTENT_STAUTS field indicates that they are not deleted (i.e. the value is not equal to 'D').

The read schema 240 further represents tables that contain operational data generated in the authoring environment 200 (e.g. ORDERS table 270) but not tables that contain operational date that was copied from the production database 100 (e.g. ORDERS table 220). The read schema 240 can be used by business logic applications in the authoring environment 200 to access the operational data generated in the authoring environment 200.

Although the present exemplary authoring environment 200 has only one operational data table—table ORDERS represented by tables 220, 270—it will be understood that the authoring environment 200 can have any number of operational data tables while remaining within the scope and spirit of the present invention. All operational data tables that contain operational data generated in the authoring environment 200 will be represented in the read schema 240.

The base schema 230, the read schema 240 and the write schema 250 can be referred to collectively as a database schema. The database schema can be used by one or more business logic applications to access and manipulate the business objects contained in a database comprising the authoring environment 200.

There are three classifications of data in the authoring environment 200 (i.e. in the database). The data contained in each table is classified as one of content managed, operational and configuration. Content managed data (e.g. table CATALOG 260) is data that is changed by a business user. The content managed data can, after testing, be propagated to the corresponding tables in the production database 100 (e.g. table CATALOG 110). Operational data is runtime data that is associated with the content managed data (e.g. table ORDER 270). In the authoring environment 200, operational data is test data for the managed content data. In the production environment 100, operational data is transactional data (e.g. table ORDER 120). During testing changes to the content managed data can generate operational data. Operational data generated in the authoring environment (e.g. table ORDERS 270) is kept separate from operational data originating from the production database (e.g. table ORDERS 220) so that propagation of the operational data resulting from testing in the authoring environment 200 to the production database 100 can be controlled or prevented. Configuration data (e.g. configuration data table 280) is static information about the DBMS configuration that is usually updated by a DBMS administrator and will need to be propagated to the production database only rarely.

In an alternative embodiment of the present invention, the authoring environment 200 can be organized using workspaces. Each workspace has a database schema having base schema 230, a read schema 240 and a write schema 250. A workspace is used to support a set of changes to the content data known as a job. Multiple concurrent jobs can be supported in the authoring environment 200 each one associated with a unique one of multiple concurrent workspaces and an associated database schema.

Figure 6:
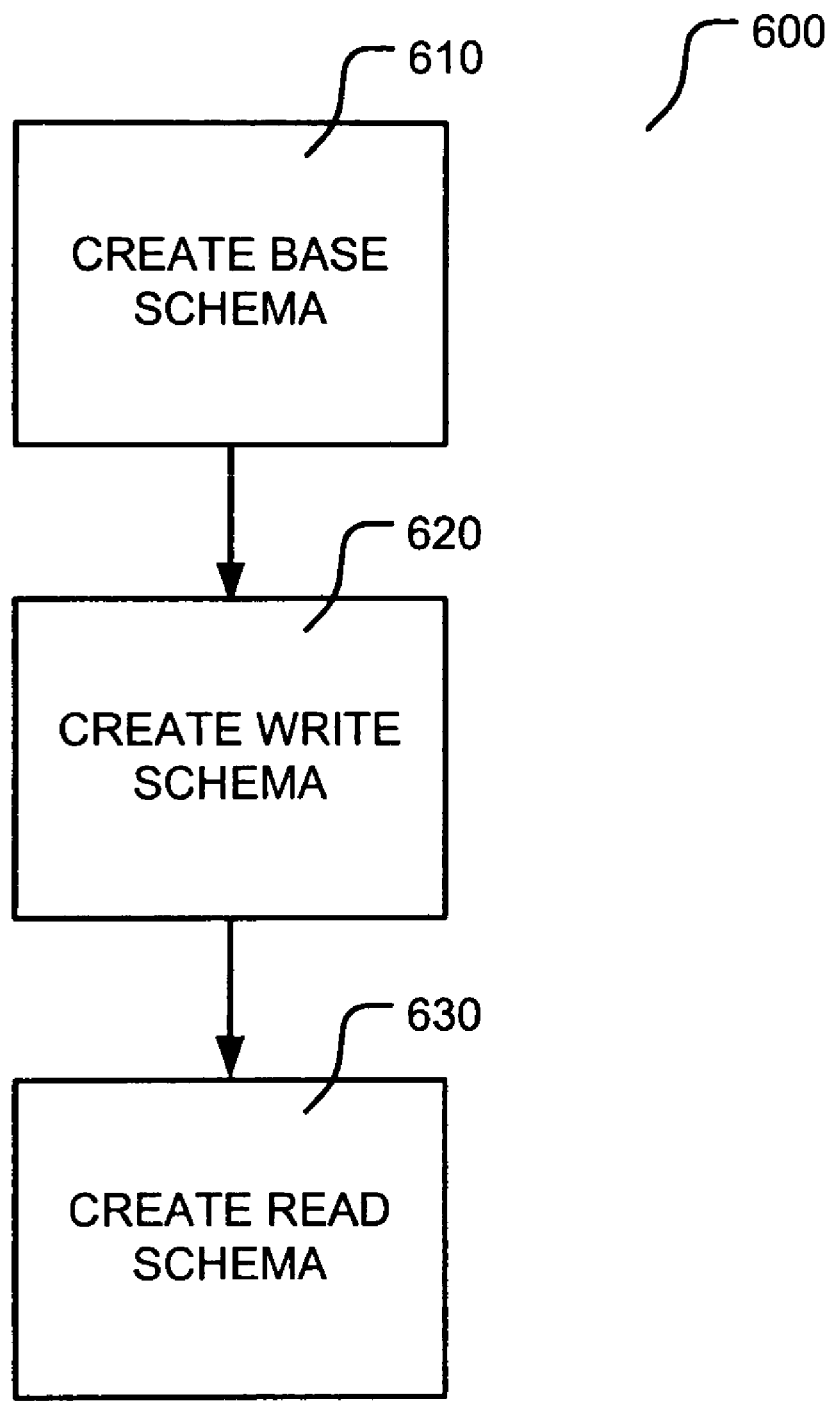
FIG. 6 is a representation of steps in a method for creating a database schema according to an embodiment of the present invention.

FIG. 6 is a representation of steps in a method 600 for creating a database schema according to an embodiment of the present invention. The database schema can be used to access and manipulate content managed data in an authoring environment such as, for example, authoring environment 200 having a database corresponding to a production database such as, for example, production database 100. A base schema 230 is created in step 610 that represents content data tables (e.g. CATALOG table 210) and operational data tables (e.g. ORDERS table 220) which can be copied from corresponding tables in the production database 100. The base schema 230 can also represent a configuration data table (e.g. table 280) that contains static configuration information about a database management system (DBMS) with which the authoring environment 200 is implemented. Each content data table represented in the base schema 230 to be content managed in the authoring environment 200 can be registered as a managed resource and a corresponding content managed data table can be created (e.g. CATALOG table 260). Each operational data table represented in the base schema 230 can be registered as an operational resource and a corresponding content management operational data table can be created (e.g. ORDERS table 270). A write schema 250 is created in step 620 that includes a representation for each content managed data table and each content management operational data table (i.e. each registered resource) such as, for example, CATALOG table 260 and ORDERS table 270 respectively. The content managed data table (e.g. table CATALOG 260) represented by the write schema 250 has the same definition (i.e. fields) as the content data table (e.g. table CATALOG 210) represented by the base schema 230 plus additional content management fields. The content management operational data table (e.g. table ORDERS 270) represented by the write schema 250 has the same definition (i.e. fields) as the operational data table (e.g. table ORDERS 220) represented by the base schema 230 and can include additional content management fields, for example, indicating whether or not a business object was populated by copying from the corresponding base schema 230 represented table (e.g. table ORDERS 220). The write schema 250 can also have an alias to the configuration data table (e.g. table 280). A read schema 240 is created in step 630 that includes a representation for each content management operational data table (i.e. each registered operational resource) such as, for example ORDERS table 270 and a view for each content managed data table (i.e. each registered managed resource) such as, for example CATALOG table 260. The view selects the content in a corresponding base schema 230 represented content data table (e.g. CATALOG table 210) along with the changes made in the write schema 250 represented content managed data table (e.g. CATALOG table 260). The changes represented in the content managed data table (e.g. CATALOG table 260) take precedence over the content represented in the content data table (e.g. CATALOG table 210). A new business object represented in the content managed data table (e.g. CATALOG table 260) will appear in the view. A modified business object represented in the content managed data table (e.g. CATALOG table 260) will appear in the view in place of a corresponding business object represented in the content data table (e.g. CATALOG table 210). A business object represented in the content managed data table (e.g. CATALOG table 260) that is marked as deleted will not appear in (i.e. will be excluded from) the view nor will a corresponding business object represented in the content data table (e.g. CATALOG table 210). The read schema 240 can also have an alias to the configuration data table (e.g. table 280).

The method 600 according to the present invention can be implemented by a computer program product comprising computer-executable instructions stored on a computer readable medium. The computer-executable instructions can be executed on any conventional computing platform (not illustrated) such as, for example, that used to support the DBMS used to implement the authoring environment 200. The computing platform suitable for executing instructions will include at least one processor coupled directly or indirectly to memory elements through a system bus. The memory elements can include local memory employed during actual execution of the instructions, bulk storage, and cache memories which provide temporary storage of at least some instructions in order to reduce the number of times code must be retrieved from bulk storage during execution. Input/output or I/O devices (including but not limited to keyboards, displays, pointing devices, etc.) can be coupled to the platform either directly or through intervening I/O controllers. Network adapters may also be coupled to the platform to enable the platform to become coupled to other platforms or remote printers or storage devices through intervening private or public networks. Modems, cable modem and Ethernet cards are just a few of the currently available types of network adapters.

For the purposes of this description, a computer readable medium can be any apparatus that can contain, store, communicate, propagate, or transport the program for use by or in connection with the instruction execution platform. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 7:
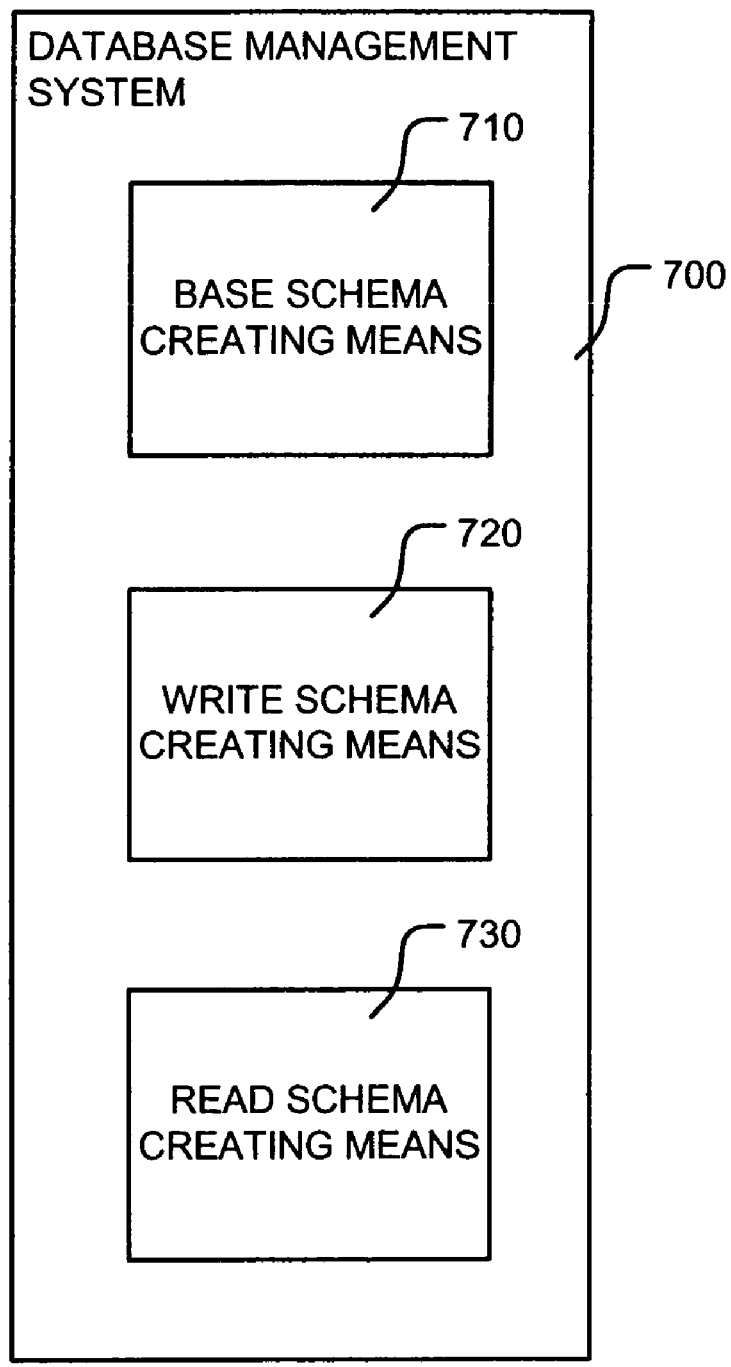
FIG. 7 is a schematic representation of a database management system (DBMS) that can be used to create a database schema for content managed data according to an embodiment of the present invention.

FIG. 7 is a schematic representation of a database management system (DBMS) 700 that can be used to create a database schema for content managed data according to an embodiment of the present invention. The DBMS 700 can be implemented on a conventional computing platform (not illustrated) comprising an instruction processing unit, addressable memory and a mass storage system (e.g. hard disk drive). The DBMS 700 comprising an element for creating a base schema 710; an element for creating a write schema 720 and an element for creating a read schema 730. The element for creating a base schema 710 creates the base schema 230 in accordance with the description provided above with respect to step 610 of method 600. The element for creating a write schema 720 creates the write schema 250 in accordance with the description provided above with respect to step 620 of method 600. The element for creating a read schema 730 creates the read schema 240 in accordance with the description provided above with respect to step 630 of method 600. Each of the elements 710, 720 and 730 can be implemented using dedicated DBMS 700 components, using computer-executable instructions contained in the addressable memory and executed by the processing unit, using stored procedure code stored in the mass storage system and executable by the processing unit, using other similar processing-unit-executable directives, and combinations thereof.

It will be apparent to one skilled in the art that numerous modifications and departures from the specific embodiments described herein may be made without departing from the spirit and scope of the present invention.

The invention claimed is:

1. A data structure embodied on a computer-readable medium in conformance with a database schema for accessing and managing content managed data in a database, the database schema comprising:

a base schema representing a content data table and an operational data table;

a write schema representing a content managed data table and a content managed operational data table, wherein the content managed data table includes one or more business object fields that correspond to business object fields in the content data table and at least one content management field, and wherein one content management field indicates an operation performed on a business object;

a read schema representing the content managed operational data table and having a view representing the content managed data table and the content data table, wherein the view is configured to:

select business objects from the content managed data table and the content data table giving precedence to a business object in the content managed data table over a corresponding business object in the content data table, select a business object from the content managed data table having a content management field indicating a create operation, select a business object from the content managed data table, having a content management field indicating a modify operation, over a corresponding business object in the content data table, and exclude a business object in the content managed data table having a content management field indicating a delete operation and exclude a corresponding business object in the content data table; and the database schema used by a business logic application to access and manipulate the content managed data in the database.

2. The data structure of claim 1, the content managed operational data table having: business object fields that correspond to business object fields in the operational data table.

3. A method for creating a database schema for accessing and managing content managed data comprising the steps of:

creating a base schema representing a content data table and an operational data table;

creating a write schema representing a content managed data table and a content managed operational data table, wherein the content managed data table includes one or more business object fields that correspond to business object fields in the content data table and at least one content management field, and wherein one content management field indicates an operation performed on a business object;

creating a read schema representing the content managed operational data table and having a view representing the content managed data table and the content data table, wherein the view is configured to:

select business objects from the content managed data table and the content data table giving precedence to business objects in the content managed data table over a corresponding business object in the content data table, select a business object from the content managed data table having a content management field indicating a create operation.

select a business object from the content managed data table. having a content management field indicating a modify operation. over a corresponding business object in the content data table, and exclude a business object in the content managed data table having a content management field indicating a delete operation and excludes a corresponding business object in the content data table; and the database schema used by a business logic application to access and manipulate the content managed data in the database.

4. The method of claim 3, wherein the content managed operational data table has:
business object fields that correspond to business object fields in the operational data table.

5. A computer program product for creating a database schema for accessing and managing content managed data, the computer program product comprising:
a computer usable medium having stored thereon computer-executable instructions, the computer-executable instructions when executed on a computer instructing the computer for:
creating a base schema representing a content data table and an operational data table;
creating a write schema representing a content managed data table and a content managed operational data table, wherein the content managed data table includes one or more business object fields that correspond to business object fields in the content data table and at least one content management field, and wherein one content management field indicates an operation performed on a business object;
creating a read schema representing the content managed operational data table and having a view representing the content managed data table and the content data table, wherein the view is configured to:
select business objects from the content managed data table and the content data table giving precedence to business objects in the content managed data table over a corresponding business object in the content data table,
select a business object from the content managed data table having a content management field indicating a create operation,
select a business object from the content managed data table, having a content management field indicating a modify operation, over a corresponding business object in the content data table, and
exclude a business object in the content managed data table having a content management field indicating a delete operation and exclude a corresponding business object in the content data table; and
wherein the database schema can be used by a business logic application to access and manipulate the content managed data in the database.

6. The computer program product of claim 5, the computer-executable instructions for creating a write schema wherein the content managed operational data table having:
business object fields that correspond to business object fields in the operational data table.

7. A database management system for creating a database schema for accessing and managing content managed data comprising:
a processor; and
a memory containing the database management system, the database management system comprising:
an element for creating a base schema representing a content data table and
an operational data table;
an element for creating a write schema representing a content managed data table and a content managed operational data table, wherein the content managed data table includes one or more business object fields that correspond to business object fields in the content data table and at least one content management field, and wherein one content management field indicates an operation performed on a business object;
an element for creating a read schema representing the content managed operational data table and having a view representing the content managed data table and the content data table, wherein the view is configured to:
select business objects from the content managed data table and the content data table giving precedence to business objects in the content managed data table over a corresponding business object in the content data table,
select a business object from the content managed data table having a content management field indicating a create operation,
select a business object from the content managed data table, having a content management field indicating a modify operation, over a corresponding business object in the content data table, and
exclude a business object in the content managed data table having a content management field indicating a delete operation and exclude a corresponding business object in the content data table; and
a database schema used by a business logic application to access and manipulate the content managed data in the database.

8. The database management system of claim 7, wherein the content managed operational data table has:
business object fields that correspond to business object fields in the operational data table
a content management field.

* * * * *